US008281811B2

(12) United States Patent
Rau

(10) Patent No.: US 8,281,811 B2
(45) Date of Patent: Oct. 9, 2012

(54) LARGE MANIPULATOR

(75) Inventor: Kurt Rau, Hammersbach (DE); Ute Else Margarethe Rau, legal representative, Hammersbach (DE); Andreas Rau, legal representative, Hammersbach (DE); Michael Rau, legal representative, Hammersbach (DE); Christine Rau, legal representative, Hammersbach (DE)

(73) Assignee: Putzmeister Engineering GmbH, Aichtal (DE)

( * ) Notice: Subject to any disclaimer, the term of this patent is extended or adjusted under 35 U.S.C. 154(b) by 580 days.

(21) Appl. No.: 12/449,365

(22) PCT Filed: Jan. 22, 2008

(86) PCT No.: PCT/EP2008/050715
§ 371 (c)(1), (2), (4) Date: Aug. 4, 2009

(87) PCT Pub. No.: WO2008/110397
PCT Pub. Date: Sep. 18, 2008

(65) Prior Publication Data
US 2010/0139792 A1 Jun. 10, 2010

(30) Foreign Application Priority Data
Mar. 13, 2007 (DE) ......................... 10 2007 012 575

(51) Int. Cl.
*E04G 21/04* (2006.01)
*B25J 18/00* (2006.01)
*G05B 19/02* (2006.01)

(52) U.S. Cl. ..... 137/615; 137/556; 141/387; 74/490.01; 340/4.3; 340/12.51

(58) Field of Classification Search .................. 137/615, 137/556.3, 556, 553; 251/129.04; 141/387; 74/490.01; 340/12.51, 4.3
See application file for complete search history.

(56) References Cited

U.S. PATENT DOCUMENTS 4,205,308 A * 5/1980 Haley et al. .................. 137/615
4,817,625 A 4/1989 Miles
5,823,218 A 10/1998 Schlecht et al.
(Continued)

FOREIGN PATENT DOCUMENTS

DE 44 12 643 3/1995
(Continued)

OTHER PUBLICATIONS

International Search Report, Sep. 18, 2008.
(Continued)

*Primary Examiner* — Kevin Lee
(74) *Attorney, Agent, or Firm* — Collard & Roe, P.C.

(57) ABSTRACT

A large manipulator, especially a truck-mounted concrete pump, has a boom base that can be arranged on a frame so as to be pivoted about a substantially vertical axis of rotation. The large manipulator has a pendular element, that hangs down as an articulated boom and a control device for controlling the drive units of the axes of articulation and rotation of the articulated boom. The remote control has at least one inclination sensor which is housed in a housing that is detachably fastened on the pendular element. Two inclination sensors are housed in the housing and are bent at an angle of 90° with respect to each other and with respect to an axis that is parallel to the pendular element axis. The housing has a mark indicating the orientation of at least one of the inclination sensors inside the housing.

38 Claims, 2 Drawing Sheets

U.S. PATENT DOCUMENTS

| | | | |
|---|---|---|---|
| 6,202,013 | B1 | 3/2001 | Anderson et al. |
| 6,439,407 | B1 | 8/2002 | Jacoff et al. |
| 6,862,509 | B2 | 3/2005 | Rau et al. |
| 6,883,532 | B2 * | 4/2005 | Rau ............................... 137/615 |
| 7,729,832 | B2 * | 6/2010 | Benckert et al. ................ 701/49 |
| 2004/0099063 | A1 | 5/2004 | Frederick |
| 2005/0278099 | A1 | 12/2005 | Benckert et al. |
| 2006/0176174 | A1 | 8/2006 | Gollu et al. |
| 2007/0052540 | A1 | 3/2007 | Hall et al. |

FOREIGN PATENT DOCUMENTS

| | | |
|---|---|---|
| DE | 197 54 841 | 6/1999 |
| DE | 100 60 077 | 6/2002 |
| DE | 102 40 180 | 3/2004 |
| DE | 103 60 309 | 7/2005 |
| EP | 0 715 673 | 6/1996 |
| EP | 1 356 910 | 10/2003 |
| GB | 2 184 090 | 6/1987 |
| WO | WO 97/19888 | 6/1997 |

OTHER PUBLICATIONS

Benckert, H., "Computer Controlled Concrete Distribution," Automation and Robotics in Construction, Proceedings of the International Symposium on Automation and Robotics in Construction, vol. 8, Jan. 1991, pp. 111-119. (ISR).

* cited by examiner

LARGE MANIPULATOR

BACKGROUND OF THE INVENTION

1. Field of the Invention

The invention relates to a large manipulator, particularly to a concrete pump truck, having a mast base that can be rotated about an essentially vertical axis of rotation, by means of a drive unit, and is disposed on a frame, particularly on a chassis, having an articulated mast composed of at least two mast arms, which mast arms can be pivoted, in limited manner, relative to the mast base or an adjacent mast arm, about horizontal articulation axes that are parallel to one another, in each instance, by means of another drive unit, in each instance, having a pendulum element that hangs down from the mast tip of the last mast arm, having a setting element disposed in a control device, and having a computer-assisted coordinate sensor that responds to output signals of the setting element, and activates the drive units of the articulation and rotation axes in accordance with an adjustment path that is displayed by means of the setting element, relative to the current position of the mast tip, whereby the mast tip can follow the spatial movements of the setting element.

2. The Prior Art

Large manipulators of this type are understood to be work machines such as concrete pump trucks, mixer pumps, spray robots, and the like, which can be used with a full 360° pivot range of the mast base, even in the extended horizontal position of the articulated mast, if suitable support is provided. The operator is responsible for control of the large manipulator and for positioning of the pendulum element disposed on the last arm of the articulated mast, preferably configured as an end hose.

In the case of a large manipulator configured as a concrete pump truck, having a remote control device, it is already known (EP-0 715 673 B2) that the operator guides the pendulum element, which is configured as an end hose, to the concrete application location by hand, and that the mast tip automatically follows this element there. For this purpose, a signal transmission link is provided, with which the mast tip can be moved by the operator, with computer assistance, by way of an adjustment path that is predetermined by the end hose. The setting element is configured as a direction-sensitive inclination sensor that is disposed on the movable end hose, in releasable and/or height-adjustable manner. The direction sensitivity of the inclination sensor is implemented there by means of the use of a two-axis inclination sensor. The inclination sensor has evaluation electronics for outputting an adjustment path signal that is dependent on the measured inclination direction, and a velocity signal for the movement of the mast tip that is dependent on the measured inclination angle. The inclination sensor is situated in a housing that is attached to the end hose, in torque-proof manner, with regard to the mast tip. Because of this measure, it is possible to move the mast tip into a direction corresponding to the deflection direction, when the end hose is deflected, at a speed that is dependent on the deflection or inclination angle.

SUMMARY OF THE INVENTION

Proceeding from this, the invention is based on the task of improving the large manipulator with its control device fixed in place on the pendulum element, to the effect that positioning of the control device on the pendulum element is facilitated and simplified.

To accomplish this task, the combinations of characteristics indicated in claims 1 and 8 are proposed. Advantageous embodiments and further developments of the invention are evident from the dependent claims.

An advantageous embodiment of the invention provides that the articulated mast of the large manipulator configured as a concrete pump truck is configured as a concrete distributor, and that a concrete feed line is guided by way of the mast arms, which feed line opens, at its end, into an end hose that hangs down from the mast tip and forms the pendulum element.

According to a first preferred embodiment variant of the invention, two inclination sensors angled by an angle of 90° relative to one another, about an axis parallel to the pendulum element axis, are disposed in the interior of the housing, whereby the housing furthermore has a marking that indicates the orientation of at least one of the inclination sensors within the housing. It is advantageous if the inclination sensors are disposed on two accommodation parts that are angled at 90° relative to one another, of a support plate embedded in the interior of the housing, whereby the support plate has another accommodation part that accommodates the related electronics. In this connection, the electronics are connected with the outputs of the inclination sensors, and particularly serve for signal processing and transmission to the coordinate sensor of the on-board computer.

Another preferred embodiment of the invention provides that the rigid support plate with its parts that are situated on the accommodation parts is embedded in the housing, which consists of an elastomer material, in space-saving manner. Preferably, belts are disposed on or formed onto the two ends of the housing that face away from one another, with which belts the housing can be fixed in place on the end hose, in the manner of a sensor belt, so that it cannot be rotated or displaced. The marking according to the invention is preferably configured as a line marking that is disposed on the housing surface and oriented in the extension direction of the articulated mast. In this way, it is ensured that the two inclination sensors are direction-sensitive, in other words that they respond both to deflections of the pendulum element in the extension direction and in the direction sideways to this, and therefore are suitable for issuing an adjustment path signal, together with the related evaluation electronics. Furthermore, a velocity signal that is dependent on the measured inclination angle can be produced for the movement of the mast tip.

For reasons of operational reliability, the drive units of the articulated mast and of the mast base are controlled in combination, for practical purposes while maintaining the height of the mast tip in a predetermined horizontal plane. In this way, the result is achieved that the mast tip follows the setting element on the pendulum element in such a manner that it always remains a certain height distance above the substratum. Furthermore, it is ensured that the mast tip is made to follow only at a predetermined minimum deflection of the pendulum element of ±50 cm, for example. In addition, a manually activated height adjustment element can be provided on the sensor belt for adjusting the height of the mast tip.

A second alternative embodiment variant according to the invention provides that the control device has a first three-dimensional inertial sensor that is fixed in place on the pendulum element as a setting element, and a second three-dimensional inertial sensor that is fixed in place on the frame as a reference element for determining the current frame-fixed pendulum element coordinates, and that the coordinate sensor responds to the output data issued by the two inertial sensors, forming the control signals for the drive units of the axes of rotation and articulation. With these measures, the result is achieved that fixation of the control device on the pendulum element, so as to prevent displacement and rotation, which is necessary when using inclination sensors, is not important. Furthermore, the inertial sensors also allow a certain twisting of the end hose, which would lead to inaccuracies in the mast control when using inclination sensors. The inertial sensors according to the invention advantageously have a number of gravitation sensors or gyroscope units that corresponds to the number of degrees of freedom.

According to another preferred embodiment of the invention, in which another setting element for activating a feed amount regulator of the concrete pump is provided, the additional setting element is situated in the housing disposed fixed in place on the end hose, and is connected with the concrete pump by way of a signal link, whereby on the input side, it advantageously communicates, without contact, with an external activation organ. With this measure, the result is achieved that activation of the feed amount regulator by the operator is possible without the operator removing his hands from the end hose. It is advantageous if the additional setting element has two setting inputs for this purpose, which correspond to a feed amount increase or decrease, and which can be activated without contact, by way of a radio link. In this connection, it is practical if the radio link has an RFID transponder (RFID=Radio Frequency Identification) as the triggering organ, and an RFID read receiver that is fixed in place on the end arm, whereby the at least one RFID transponder transmits an identity and base data packet to the remote control, by way of the RFID read receiver, during every transmission process. In this way, it is ensured that only an authorized user who has the RFID transponder (RFID tag) can activate the pump by way of the remote control. It is practical if a separate RFID read receiver is assigned to every setting input, while the at least one RFID transponder can be integrated into a work glove.

Another preferred embodiment of the invention provides for an additional radio remote control device that the operator carries with him, and that comprises multiple control units that communicate with the mast drive and/or the pump drive by way of a radio link, whereby the control units of the radio remote control device and the setting elements in the housing affixed to the end hose can optionally be activated by way of a switching element on the radio remote control device. With these measures, the result is achieved that the operator can optionally use the radio remote control device or the remote control device affixed to the end of the hose for activating the mast and operating the pump. In order to avoid incorrect use by non-authorized operators, it is furthermore proposed, according to the invention, that the radio remote control device carries an RFID transponder (RFID tag), the content of which can be read and identified by way of an RFID reader receiver (RFID reader) disposed in the housing affixed to the end arm.

The invention furthermore relates to a remote control device for fixation on a pendulum element of a large manipulator, having a housing and having at least one setting element disposed in the housing, for control of the large manipulator.

A first embodiment variant of the remote control device according to the invention provides that two inclination sensors angled at an angle of 90° relative to one another, about a housing axis, are disposed in the interior of the housing, and that the housing carries a marking that indicates the orientation of at least one of the inclination sensors within the housing.

According to an advantageous embodiment of the invention, the inclination sensors of the remote control device are disposed on two accommodation parts of a support plate embedded into the interior of the housing, which parts are angled by 90° relative to one another. Furthermore, the support plate can have another accommodation part that carries the evaluation electronics, which part is preferably disposed between the two accommodation parts that carry the two inclination sensors, and is angled relative to these.

According to another embodiment variant according to the invention, the setting element of the remote control device is configured as a three-dimensional inertial sensor fixed in place on the end hose. Furthermore, a second three-dimensional inertial sensor, fixed in place on the frame, is provided as a reference element for determining the current end-hose coordinates fixed in place on the frame. The inertial sensors according to the invention advantageously have a number of gravitation sensors and/or gyroscope units that corresponds to the number of degrees of freedom.

Another preferred or alternative embodiment of the invention provides that the rigid support plate, with its parts situated on the accommodation parts, is embedded into the housing, which consists of an elastomer material, so as to save space. Preferably, belts are disposed on or formed onto the two ends of the housing that face away from one another, with which belts the housing can be fixed in place on a pendulum element or end hose in the manner of a sensor belt, to prevent rotation or displacement. The marking according to the invention is preferably configured as a line marking disposed on the housing surface.

According to an advantageous embodiment of the invention, in which another setting element for activating a feed amount regulator is provided, the additional setting element is situated in the housing and communicates, on the input side, advantageously in contact-free manner, with an external activation organ. With this measure, the result is achieved that activation of the feed amount regulator by the operator is possible, without the operator taking his hands off the pendulum element or end hose. It is advantageous if the additional setting element has two setting inputs for this purpose, which correspond to a feed amount increase or reduction, and which can be activated in contact-free manner, by way of a radio link.

BRIEF DESCRIPTION OF THE DRAWINGS

In the following, the invention will be explained in greater detail using the exemplary embodiments shown schematically in the drawing. This shows.

DETAILED DESCRIPTION OF THE PREFERRED EMBODIMENTS

Figure 1A:
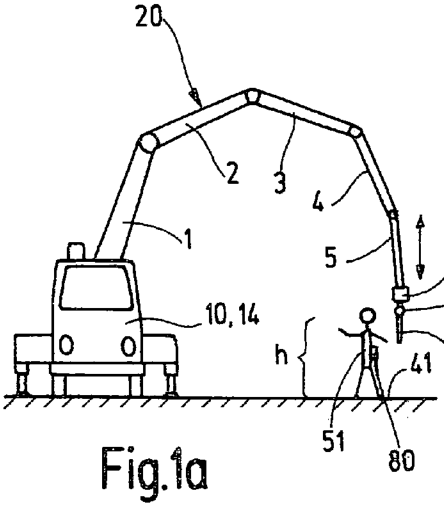
FIGS. 1*a* and *b* a side view and a top view of a concrete pump truck with the articulated mast extended.
Figure 1B:
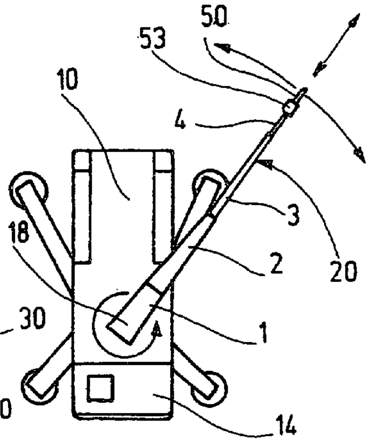

The large manipulators shown schematically in FIGS. 1*a*, *b*, and 7, configured as concrete pump trucks, have a chassis 10, a mast base 16 that is disposed in the vicinity of the front axle 12 and of the driver's cab 14 of the chassis 10, can rotate about a vertical axis of rotation 18 by 360°, carries an articulated mast 20, as well as a feed line, not shown in the drawing, which line is guided by way of the mast arms 1, 2, 3, 4, 5 of the articulated mast, and ends in the region of the mast tip 55, in an end hose 50 that forms a pendulum element.

To activate the drive units of the articulated mast 20, a remote control device is provided, which comprises a signal transmitter 53 and a central control fixed in place on the vehicle, which communicates with the signal transmitter 53 galvanically or in wireless manner. To adjust the mast tip 55 and the end hose 50 that is disposed on it and hangs downward, at least one setting element 52, 54 that communicates with the signal transmitter 53 is provided, which element is activated by the operator 51.

Figure 2:
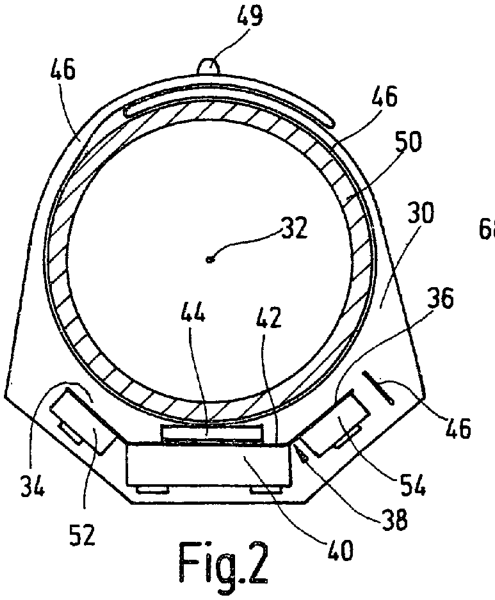
FIG. 2 a section through the end hose of the concrete pump truck, with a sensor belt fixed in place on the end hose.

In the exemplary embodiment shown in FIG. 2, the setting elements 52, 54 are configured as inclination sensors or gravitation sensors, which are disposed in a housing 30 that is releasably attached to the end hose 50. In this connection, the inclination sensors 52, 54 determine the hose inclination relative to the earth gravitation, and pass the data on to the central control of the concrete pump, for example by way of a CAN bus or a radio link. In this manner, the end hose 50 becomes a two-axis joystick.

As is particularly evident from FIG. 2, there are two inclination sensors 52, 54 in the housing 30, angled at an angle of 90° relative to one another about an axis that is parallel to the end hose axis 32. For this purpose, the inclination sensors are disposed on two accommodation parts 34, 36 of a support plate 38, which are angled at 90° relative to one another. Furthermore, the support plate 38 has an accommodation part 42 that carries the evaluation electronics 40, which part is disposed between the two accommodation parts 34, 36 that carry the inclination sensors, and is angled relative to these parts. The rigid support plate 38 with its parts situated on the accommodation parts 34, 36, 42 is embedded into the housing 30, which is configured from an elastomer material. Belts 46 are formed onto the two ends of the housing that face away from one another, with which belts the housing 30 can be fixed in place on the end hose 50, in the manner of a sensor belt, so as to prevent rotation and displacement. In the evaluation electronics 40, the inclination data of the inclination sensors 52, 54 are turned over either to a CAN bus or to an additional RFID reader 44 integrated into the housing. The RFID reader 44 additionally ensures that release of the mast movement can only take place if an authorized operator 51, who carries a corresponding RFID transponder, stands close enough to the end hose.

Figure 3:
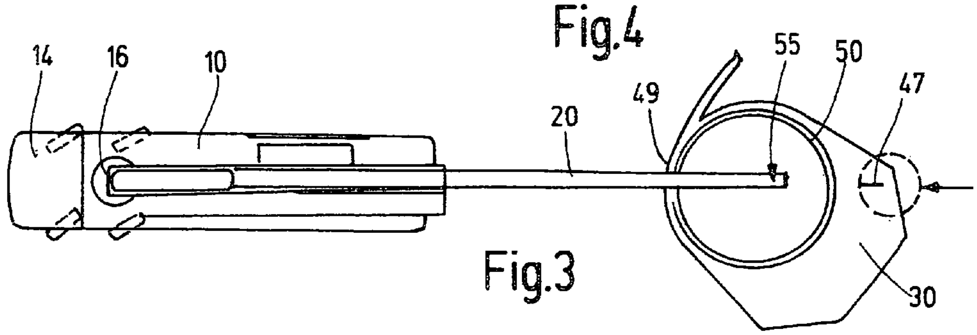
FIG. 3 a top view of a concrete pump, with a sensor belt shown in enlarged manner, to illustrate the orientation of the sensor belt on the end hose.

As is particularly evident from FIG. 3, there is a line marking 47 on the housing 30, which ensures that the sensor belt can be fixed in place on the end hose so as to prevent rotation, with its inclination sensors 52, 54 being in a specific orientation that points in the extension direction of the articulated mast 20 in the exemplary embodiment shown. The inner shape of the sensor belt is adapted to the outside circumference of the end hose 50. Fixation on the end hose 50 takes place using a nub/hole arrangement 49 that allows an adaptation to different hose diameters, within a certain range. The connection of the belt bands 46 when fixing the sensor belt in place on the end hose 50 can also take place using a hook-and-loop closure, for example.

Figure 4:
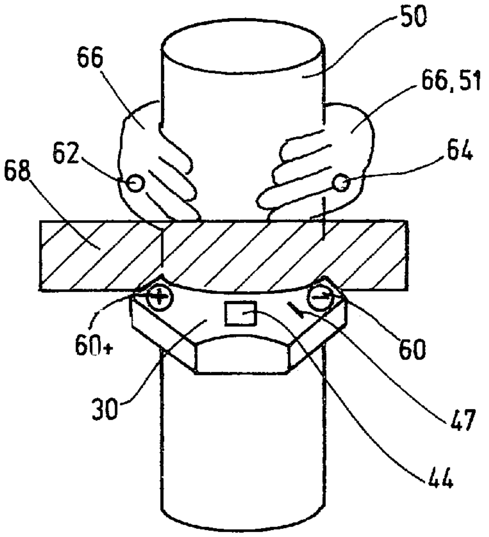
FIG. 4 a detail from an end hose having a sensor belt, to illustrate the distance range for activation of the setting elements for the transport amount setting.

In the housing 30 of the sensor belt, a setting element 60+, 60− can furthermore be accommodated, for activating the feed pump. The setting data of this setting element can also be passed on by way of the CAN bus or by way of a radio link. In the case of the exemplary embodiment shown in FIG. 4, activation of the setting elements 60+, 60− for the concrete pump takes place by way of a radio link, using RFID transmitters 62, 64, which are disposed in the gloves 66 of the operator 51 in the exemplary embodiment shown. A recognition range 68 can be set on the setting elements, within which a switching process or control process can be triggered. When the plus setting element 60+ is approached, the feed amount is increased, while when the minus setting element 60− is approached, the feed amount is reduced. The operator 51 at the end hose 50 therefore does not have to remove his hands from the hose in order to adjust the feed amount of the concrete pump.

Figure 5:
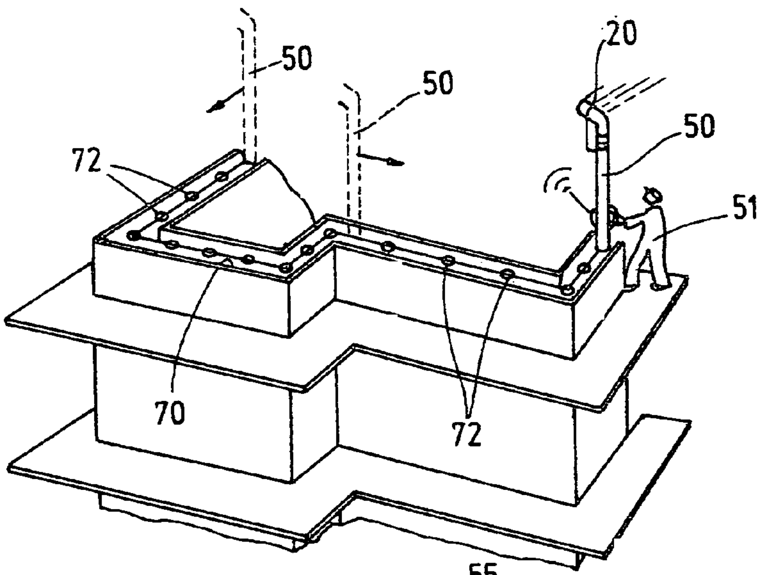
FIG. 5 an illustration of a high-rise construction, with form boards and a stationary concrete pump as an example of stationary use of the remote control device according to the invention.
Figure 6:
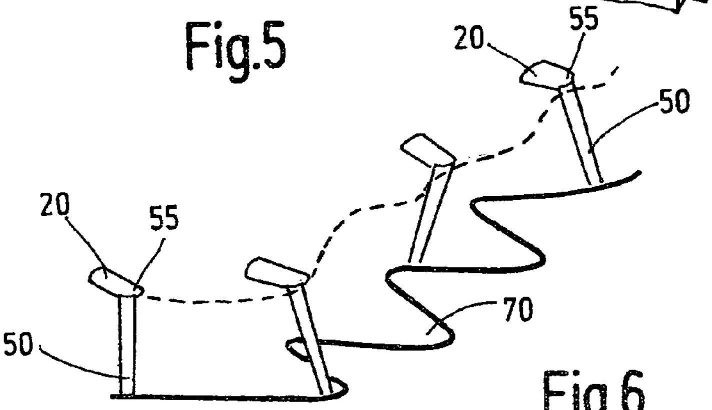
FIG. 6 a schematic representation of the movement sequence during concrete application, when using the remote control device according to the invention, to illustrate the position changes of the mast tip and of the end hose.

With the measures according to the invention, it is possible to distribute the concrete in the manner desired by an operator 51, at a concrete application location 70 by simply moving the end hose 50. As is evident from FIG. 6, rapid movements of the end hose 50 in different directions lead to only relatively slight position changes of the mast tip 55 during a pure distribution process. This is due to the fact that the mast movement responds only at a minimum deflection of the end hose 50. Continuous deflection of the end hose 50 in one direction, i.e. a slow change in direction, on the other hand, bring about the result that the mast 20 follows in the desired direction. The latter is the case, for example in the case of the exemplary embodiment shown in FIG. 5, in which a stationary concrete distribution mast 20 is moved along different positions 72 of a concrete application location 70 (form), by means of moving the end hose 50. In the case of repeated procedures of this type, the path can also be learned.

Figure 7:
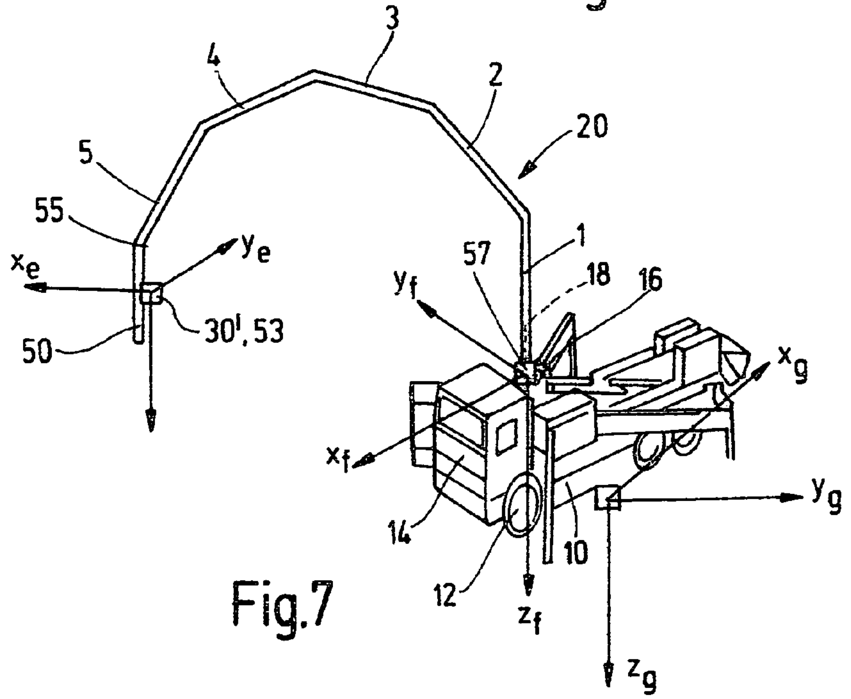
FIG. 7 a representation of the coordinate systems of a mobile concrete pump, these systems being fixed in place on the ground, on the frame, and on the end hose, to illustrate the coordinate transformations that must be carried out when using inertial sensors.

Fundamentally, it is possible to use inertial sensors on the end hose in place of the two inclination sensors that are oriented perpendicular relative to one another. In this case, it is necessary that the remote control device 30' has a first three-dimensional inertial sensor 53 fixed in place on the end hose, as a setting element, and a second three-dimensional inertial sensor 57 fixed in place on the frame, as a reference element for determining the current end hose coordinates fixed in place on the frame, whereby in addition, a computer-assisted coordinate sensor is provided, which responds to the output data issued by the two inertial sensors, forming control signals for the drive units of the axes of rotation and articulation of the articulation mast 20. In this connection, the inertial sensors 53, 57 have a number of gyroscope units and/or gravitation sensors that corresponds to the number of degrees of freedom. The number of gyroscope units and/or gravitation sensors. The orthogonal coordinate systems to be converted to one another are indicated in FIG. 7 as follows:

$(X_g Y_g Z_g)$=coordinate system fixed in place on the ground
$(X_f Y_f Z_f)$=coordinate system fixed in place on the vehicle
$(X_e Y_e Z_e)$=coordinate system fixed in place on the end hose For conversion of the coordinate systems, a transformation matrix T (ψ, θ, ϕ) is required, in each instance, whereby ψ, θ, ϕ stand for Euler's angles of the coordinate systems to be transformed.

In the computer-assisted coordinate sensor, the Cartesian coordinates are furthermore converted to the cylinder coordinates of the articulation mast fixed in place on the frame (r, h, ϕ) whereby r stands for the distance of the end hose from the axis of rotation 18 of the mast base 16, h stands for the height of the end hose above the substratum 41, and φ stands for the angle of rotation of the articulated mast 20 about the axis of rotation 18. In this connection, the variables r and h are dependent variables, which are calculated from the predetermined geometry and the measured angle positions of the mast arms within the articulated mast.

Another preferred embodiment of the invention provides that the operator 51 additionally carries a radio remote control device 80, for example on his belt, which device has multiple control units that communicate with the mast drive and/or the pump drive by way of a radio link. The control units of the radio remote control device 80 and the setting elements 52, 54 in the sensor belt fixed in place on the end hose can be optionally activated from the radio remote control device, by way of a switching element. The radio remote control device 80 can furthermore carry an RFID transponder, the content of which can be read and identified by way of the RFID reader 44 disposed in the sensor belt fixed in place on the end hose. In this way, the operator 51 can optionally control the concrete pump with the remote control device 80 from a greater distance, or directly via the end hose 50 when he approaches the latter. Release takes place by way of the RFID system.

In summary, the following should be stated: The invention relates to a large manipulator, particularly a concrete pump truck, having a mast base 16 that can be rotated about an essentially vertical axis of rotation 18, and is disposed on a frame, particularly on a chassis 10, having an articulated mast 20 having a pendulum element that is preferably configured as an end hose 50 that hangs down from the mast tip of the articulated mast, and having a control device for controlling the drive units of the axes of articulation and rotation of the articulated mast, whereby the remote control device has at least one inclination sensor 52, 54, which is disposed in a housing 30 that is releasably attached to the pendulum element 50. According to the invention, two inclination sensors 52, 54 angled by an angle of 90° relative to one another, about an axis parallel to the pendulum element axis 32, are disposed in the housing 30. In order to allow precise orientation of the housing 30, the latter has a marking 47 that indicates the orientation of at least one of the inclination sensors within the housing 30.

The invention claimed is:

1. Large manipulator having a mast base that can be rotated about a vertical axis of rotation, via at least one drive unit, and is disposed on a frame, having an articulated mast composed of at least two mast arms, which mast arms can be pivoted, in limited manner, relative to the mast base or an adjacent mast arm, about horizontal articulation axes that are parallel to one another, in each instance, via another drive unit, in each instance, having a pendulum element that hangs down from a mast tip, having first and second setting elements disposed in a control device, and having a computer-assisted coordinate sensor that responds to output signals of the first and second setting elements, and activates the drive units of the articulation and rotation axes of the articulated mast in accordance with an adjustment path that is displayed via the first and second setting elements, relative to the current position of the mast tip, whereby the mast tip can follow the spatial movements of the pendulum element, and whereby the first and second setting elements have respective first and second inclination sensors disposed in a housing, said housing being releasably attached to the pendulum element, wherein the first and second inclination sensors are angled by an angle of 90° relative to one another, about an axis parallel to the pendulum element axis, and wherein the housing has a marking that indicates the orientation of at least one of the first and second inclination sensors within the housing.

2. Large manipulator according to claim 1, wherein the articulated mast is configured as a concrete distributor mast, and wherein a concrete feed line is guided by way of the mast arms, which feed line opens, at its end, into an end hose that hangs down from the mast tip and forms the pendulum element.

3. Large manipulator according to claim 1, wherein the first and second inclination sensors are disposed on respective first and second accommodation parts that are angled at 90° relative to one another, of a support plate embedded in the interior of the housing.

4. Large manipulator according to claim 3, wherein the support plate has another accommodation part that carries the evaluation electronics connected with the first and second inclination sensors.

5. Large manipulator according to claim 3, wherein the rigid support plate with its parts that are situated on the accommodation parts is embedded in the housing, which comprises an elastomer material.

6. Large manipulator according to claim 2, wherein belts are disposed on or formed onto two ends of the housing that face away from one another, with which belts the housing can be fixed in place on the end hose, in the manner of a sensor belt, so that the housing cannot be rotated or displaced.

7. Large manipulator according to claim 1, wherein the marking is configured as a line marking that is disposed on the housing surface and oriented in the extension direction of the articulated mast.

8. Large manipulator according to claim 6, having a feed amount regulator for a concrete pump that can be activated via at least one other setting element, wherein the additional setting element is situated in the housing disposed fixed in place on an end hose or on the sensor belt, and is connected with the concrete pump by way of a signal link, and on the input side, communicates, without contact, with an external activation organ.

9. Large manipulator according to claim 8, wherein the additional setting element has at least two setting inputs that correspond to a feed amount increase or decrease, which can be activated without contact, by way of a radio link.

10. Large manipulator according to claim 9, wherein the radio link comprises at least one RFID transponder as the triggering organ, as well as an RFID reader fixed in place on the pendulum element or end arm.

11. Large manipulator according to claim 10, wherein the at least one RFID transponder transmits an identity and base data packet to the remote control device, by way of the RFID reader, during every transmission process.

12. Large manipulator according to claim 9, wherein an RFID reader is assigned to each setting input.

13. Large manipulator according to claim 10, wherein the at least one RFID transponder is integrated into a work glove of an operator.

14. Large manipulator according to claim 6, further comprising a radio remote control device having multiple control units that communicate with a mast drive and/or a pump drive by way of a radio link, whereby the control units of the radio remote control device and the setting elements in the housing affixed to the pendulum element, or in the sensor belt, can optionally be activated by way of a switching element, from the radio remote control device.

15. Large manipulator according to claim 14, wherein the radio remote control device carries an RFID transponder, the content of which can be read and identified by way of an RFID reader disposed in the housing affixed to the pendulum element or to the sensor belt.

16. Large manipulator according to claim 14, wherein an RFID transponder is disposed in the housing affixed to the pendulum element or in the sensor belt, the content of which can be read and identified by way of an RFID reader disposed in the remote control device.

17. Large manipulator having a mast base that can be rotated about a vertical axis of rotation, via a drive unit, and is disposed on a frame, having an articulated mast composed of at least two mast arms, which mast arms can be pivoted, in limited manner, relative to the mast base or an adjacent mast arm, about horizontal articulation axes that are parallel to one another, in each instance, via another drive unit, in each instance, having a pendulum element that hangs down from a mast tip, having a setting element disposed on a remote control device, and having a computer-assisted coordinate sensor that responds to output signals of the setting element, and activates the drive units of the articulation and rotation axes of the articulated mast in accordance with an adjustment path that is displayed via the setting element, relative to the current position of the mast tip, whereby the mast tip can follow the spatial movements of the pendulum element, wherein the remote control device has a first three-dimensional inertial sensor that is fixed in place on the end hose as a setting element, and a second three-dimensional inertial sensor that is fixed in place on the frame as a reference element for determining the current frame-fixed pendulum element coordinates, and wherein the coordinate sensor responds to the output data issued by the two inertial sensors, forming control signals for the drive units of the axes of rotation and articulation.

18. Large manipulator according to claim 17, wherein the articulated mast is configured as a concrete distributor mast, and wherein a concrete feed line is guided by way of the mast arms, which feed line opens, at its end, into an end hose that hangs down from the mast tip and forms the pendulum element.

19. Large manipulator according to claim 17, wherein the inertial sensors comprise a number of gyroscope units and/or gravitation sensors that corresponds to the number of degrees of freedom.

20. Remote control device for fixation on an end hose of a concrete pump that has a concrete distributor mast having a housing and having first and second setting elements disposed in the housing, the first and second setting elements being configured as first and second inclination sensors, respectively, and evaluation electronics that respond to output signals of the first and second setting elements, wherein the first and second inclination sensors are angled at an angle of 90° relative to one another, about a housing axis, and are disposed in the interior of the housing, and wherein the housing carries a marking that indicates the orientation of at least one of the inclination sensors within the housing.

21. Remote control device according to claim 20, wherein the first and second inclination sensors are respectively disposed on first and second accommodation parts that are angled at 90° relative to one another, of a support plate embedded in the interior of the housing.

22. Remote control device according to claim 21, wherein the support plate has another accommodation part that carries the evaluation electronics, which is disposed between the first and second accommodation parts that respectively carry the first and second inclination sensors, and angled relative to the first and second accommodation parts.

23. Remote control device according to claim 21, wherein the support plate with its parts that are situated on the first and second accommodation parts is embedded in the housing, which comprises an elastomer material.

24. Remote control device according to claim 20, wherein belts are disposed on or formed onto two ends of the housing that face away from one another, with which belts the housing can be fixed in place on the end hose, in the manner of a sensor belt, so that the housing cannot be rotated or displaced.

25. Remote control device according to claim 20, wherein the marking is configured as a line marking that is disposed on the housing surface.

26. Remote control device according to claim 20, wherein an additional setting element is disposed in the housing, which, on the input side, communicates, without contact, with an external activation organ.

27. Remote control device according to claim 26, wherein the additional setting element has at least two setting inputs that correspond to a feed amount increase or decrease, which can be activated without contact, by way of a radio link.

28. Remote control device according to claim 27, wherein the radio link comprises at least one RFID transponder as the triggering organ, as well as an RFID reader fixed in place on the end arm.

29. Remote control device according to claim 28, wherein the at least one RFID transponder transmits an identity and base data packet, by way of the RFID reader, during every transmission process.

30. Remote control device according to claim 27, wherein an RFID reader is assigned to every setting input.

31. Remote control device according to claim 28, wherein the at least one RFID transponder is integrated into a work glove of an operator.

32. Remote control device for fixation on an end hose of a concrete pump that has a concrete distributor mast having a housing and having at least one setting element disposed in the housing, which responds to a deflection of the end hose, wherein the setting element is configured as a three-dimensional inertial sensor that is fixed in place on the end hose, and wherein a second three-dimensional inertial sensor that is fixed in place on a frame is provided as a reference element for determining the current frame-fixed end hose coordinates.

33. Remote control device according to claim 32, wherein the inertial sensors comprise a number of gyroscope units and/or gravitation sensors that corresponds to the number of degrees of freedom.

34. Remote control device for fixation on an end hose of a concrete pump that has a concrete distributor mast having a housing, having at least one setting element disposed in the housing, configured as an inclination sensor or as a three-dimensional inertial sensor, and evaluation electronics that respond to output signals of the setting element, whereby the housing, which is formed from an elastomer material, is provided with belts at two ends that face away from one another, with which belts the housing can be fixed in place on end hoses having different diameters, in the manner of a sensor belt, so as to prevent rotation and displacement.

35. Remote control device according to claim 34, wherein a marking is disposed on a housing surface of the housing.

36. Remote control device according to claim 34, wherein the belts have a closure for step-wise or step-free adjustment of the belt diameter.

37. Remote control device according to claim 36, wherein the closure is configured as nub/eye closures.

38. Remote control device according to claim 36, wherein the closure is configured as a hook-and-loop closure.

* * * * *